United States Patent Office 3,664,650
Patented May 23, 1972

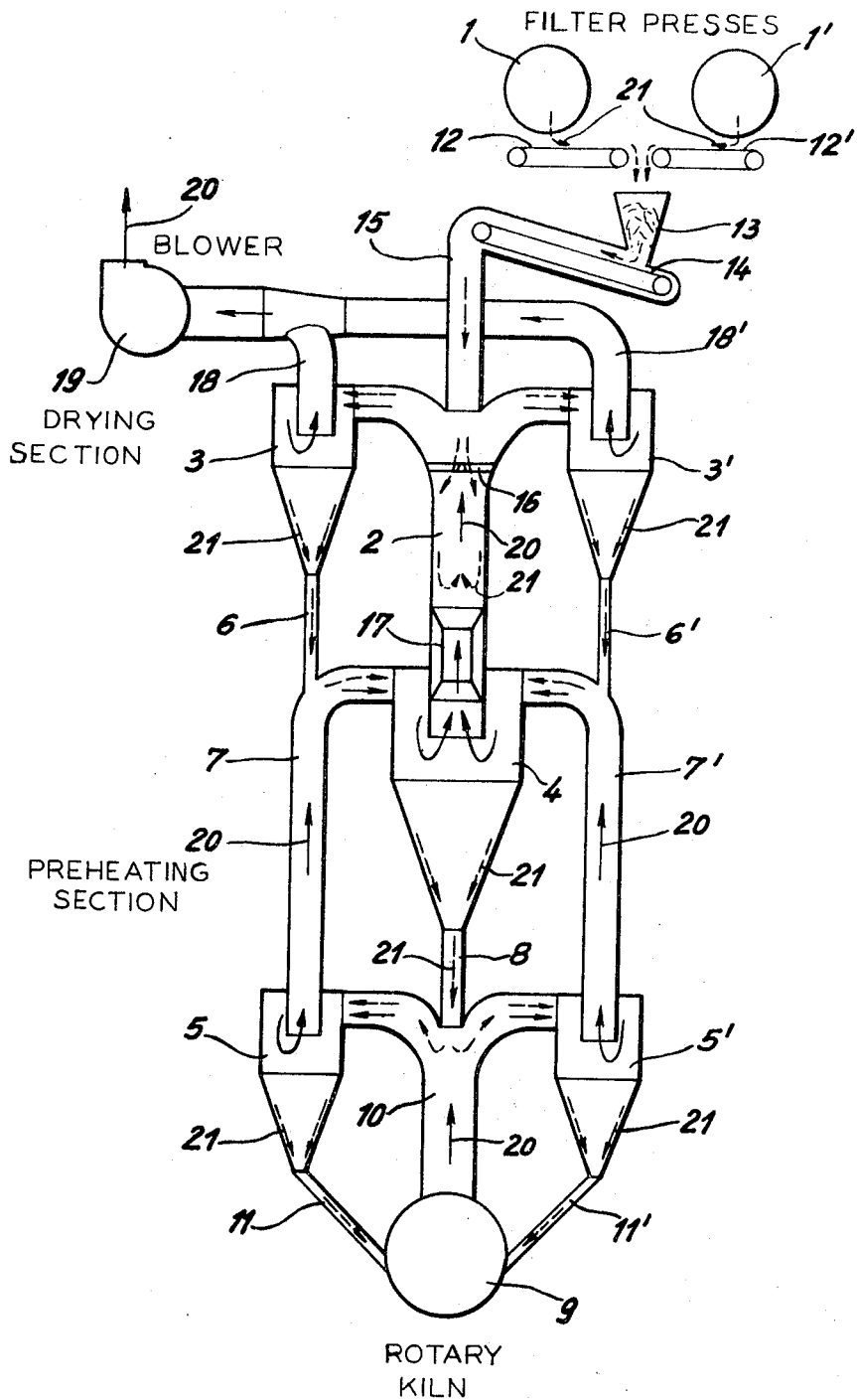

3,664,650
APPARATUS FOR HEAT TREATMENT OF MATERIAL FROM WHICH WATER HAS BEEN MECHANICALLY EXTRACTED
Paul Weber, Oelde, Horst Ritzmann, Neubeckum, and Gerhard Butschko, Ennigerloh, Germany, assignors to Polysius AG, Neubeckum, Germany
Filed Mar. 30, 1970, Ser. No. 23,859
Claims priority, application Germany, May 23, 1969, P 19 26 485.8
Int. Cl. F27b 7/32
U.S. Cl. 263—32
1 Claim

ABSTRACT OF THE DISCLOSURE

An apparatus for heat treatment of non-tacky material which has been prepared by a wet process comprises apparatus for drying the material from which water has been mechanically extracted, including a drying stack adapted to be charged centrally from above with such material and two cyclone separators connected symmetrically to the upper end of the stack, for contacting the material with hot gas. The stack is narrowed in cross section in its lower portion and has a deflector in its upper portion arranged in the path of the falling material. An apparatus for preheating the dried material includes two lower cyclone separators connected in parallel and a central cyclone separator arranged above them whose dip pipe is the lower end of the drying stack.

The invention relates to an apparatus for heat treatment of non-tacky material which has been prepared by a wet process, for example hydrated alumina, including equipment for mechanically extracting water from the wet processed material, equipment for drying and preheating of the material from which water has been mechanically extracted, comprising several cyclone separators through which hot gases are passed, and also including equipment for firing the preheated material.

Raw materials which have been prepared by a wet process are subjected to mechanical extraction of water before the following heat treatment, for the sake of heat economy. Suction filters, filter presses, centrifuges and similar apparatus find application for mechanical extraction of water.

The filter cakes thus obtained, depending upon the conditions, exhibit a moisture content between 10 and 20%. It is accordingly necessary first to dry and to pulverize these filter cakes which are still quite moist, before they can be supplied to a gas suspension preheater (consisting of several cyclone separators through which hot gases are passed).

The apparatus heretofore known provided for this purpose, in general, drying equipment in the form of belt dryers, drum dryers or agitating dryers and also usually included still further pulverizing apparatus which comminuted the dried filter cake, before feeding it to the cyclone preheaters, to such an extent that particles which could be carried in suspension were produced.

The serious disadvantage of this known apparatus consisted in the substantial expense and the considerable space requirement which were entailed by these devices for drying and pulverizing the raw material from which water had been mechanically extracted.

For heat treatment of material which has been prepared by a wet process, an apparatus has also been developed heretofore which comprises a group of four cyclone separators, for drying and preheating the material from which water has been mechanically extracted, through which hot gases from a rotary kiln are passed in series. The uppermost cyclone separator of this series, into the gas inlet passage of which the material from which water has been mechanically extracted is fed, thus serves as a drying apparatus. Also this known apparatus is still subject to various disadvantages. In the gas passage leading to the drying cyclone separator, troublesome deposition of the incoming wet material is likely to occur, particularly since the gas temperature already has been greatly reduced by the three preceding cyclone separator stages. On the other hand, if a preheating cyclone separator stage were omitted from the known apparatus, in order to provide a higher gas temperature at the point of introduction of the material, the result would be a substantial impairment of the heat efficiency of the entire apparatus.

The invention accordingly has for its object, in eliminating the disadvantages of the known embodiments, to provide an apparatus of the class hereinbefore described which is designed in such a manner that with an apparatus of simple structure and great heat efficiency, a particularly good drying action is carried out upon the freshly supplied material which has been subjected to mechanical extraction of water, so that formation of deposits in the portions of the apparatus which are contacted by the material which has only been dried is prevented.

In accordance with the invention, one constructs the drying apparatus in the form of a drying stack which is charged centrally from above the material from which water has been mechanically extracted, and two drying cyclone separators symmetrically connected to the upper end of the stack, the drying stack further being narrowed in cross section in its lower portion and having a deflector arranged in its upper portion in the path of the falling material, and the preheating apparatus being composed of two lower cyclone separators connected in parallel and a central cyclone separator arranged above them whose dip pipe consists of the lower end of the drying stack.

Since the material from which water has been mechanically extracted falls into the drying stack centrally from above, it is intensively dried at the outset by the flow of hot gas which is passing upward in this stack, before it comes in contact with the walls of the stack or other parts of the apparatus. The good drying action on the one hand is promoted by the deflector which is arranged in the path of the falling material, and which breaks up the filter cake and thus facilitates the drying of the material. The narrowing of the cross section of the drying stack in its lower portion on the other hand produces an increased velocity of flow of the upward flowing stream of gas and thus a stronger suspending action upon the material. In this way it is safely assured that all of the material charged into the drying stack will be carried upward by the rising stream of gas and conducted to the two drying cyclone separators. The danger that the moist material would be deposited at the point at which the material is supplied to the drying apparatus, which in contrast was present to a high degree in the known type of apparatus which has been described, is safely eliminated in the apparatus according to the invention.

Constructing the preheating apparatus as two lower cyclone separators connected in parallel and one central cyclone separator arranged thereabove, which constitutes the application of a two-stage preheater, has the advantage that at the point of introduction into the drying stack of the material from which water has been mechanically extracted a relatively high gas temperature is available, which is an important precondition for a rapid drying of the moist material. The parallel connection of two cyclone separators in the lowest stage of the preheater, however, assures at the same time a high heat efficiency and a uniformly good preheating of the entire material.

These and other particulars of the invention will be apparent from the following description of an embodiment which is illustrated in the drawing.

The drawing is a diagrammatic view of an apparatus embodying the invention.

The illustrated apparatus serves for the heat treatment of a non-tacky material, for example hydrated alumina or raw material for portland cement. Two filter presses 1, 1' serve for the mechanical extraction of water from the wet processed raw material. For drying of the material from which water has been mechanically extracted there is provided a drying apparatus which consists essentially of a vertical drying stack 2 and two drying cyclone separators 3 and 3' which are connected to the upper end of the stack.

This drying apparatus is arranged above a preheater which is composed of the three cyclone separators 4, 5 and 5'. The material outlet ducts 6, 6' of the cyclone separators 3, 3' discharge into the gas ducts 7, 7' which lead from the cyclone separators 5, 5' to the cyclone separator 4.

The lower end of the drying stack 2 projects like a dip pipe into the cyclone separator 4, whose material discharge duct 8 leads down into the gas duct 10 which leads from a rotary kiln 9 to the cyclone separators 5 and 5'. The material discharge ducts 11, 11' of the cyclone separators 5, 5' discharge into the rotary kiln 9.

Beneath the filter presses 1, 1' are arranged two belt conveyors 12, 12', which conduct the material from which water has been mechanically extracted to a hopper 13, from which it is supplied by a screw conveyor 14 to a chute 15 which discharges into the upper end of the drying shaft 2. The drying shaft 2 in its upper portion is provided with a deflector 16 in the form of a crosspiece. In the lower portion 17, the clear section of the drying shaft 2 is narrowed.

The drying cyclone separators 3, 3' are connected by their gas outlet passages 18, 18' to a common blower 19.

The path of the hot gases discharged from the rotary kiln 9 through the preheater and the drying apparatus is indicated by the arrows 20, and the path of the material from which water has been mechanically extracted is indicated by the dashed arrows 21.

It will be recognized that the material discharged by the screw conveyor 14 into the drying shaft 2 will first fall downward through a certain distance in the drying shaft, whereupon it will be disintegrated partly by the mechanical impact upon the deflector 16, and partly by the initial drying, and that it will then be carried upward again by the upward flowing stream of gas and delivered to the drying cyclone separators 3 and 3', from which it will then travel to the gas ducts 7, 7' of the preheater.

Since the material from which water has been mechanically extracted, which is discharged by the conveyors 12, 12' into the hopper 13, accumulates in this hopper up to a certain level, a practically gas tight seal of the chute 15 is attained. The gas flowing upward in the drying stack 2 is therefore compelled to follow the path through the drying cyclone separators 3 and 3'.

A vibratory conveying apparatus may be provided between the apparatus for mechanically extracting water from the material and the drying shaft, in order with difficult material, to promote the disintegration of the filter cake in the drying shaft.

Preferably the wet procesed material before being delivered to the drying shaft has water extracted to produce a moisture content of not more than 14%. The necessary limiting value for particular materials may be quickly determined by simple preliminary tests.

We claim:

1. Apparatus for heat treatment of wet material, comprising means for mechanically extracting water from the wet material, at least one upper drying cyclone separator having a downward-extending material outlet and an upward-extending central dip pipe for escape of exhaust gas, means for firing the material, at least one lower preheating cyclone separator which has an inlet connected to receive hot gas from the firing means and a material outlet connected to discharge material into the firing means, and which has a central dip pipe extending upward therefrom for escape of exhaust gas, and a central cyclone separator arranged below the drying cyclone separator and above the preheating cyclone separator, having an inlet connected both to the dip pipe of the preheating cyclone separator and to the material outlet of the drying cyclone separator, and having a material outlet connected to discharge material into the hot gas entering the inlet of the preheating cyclone separator, wherein the improvement comprises a central drying stack having its lower end extending downward into the center of the upper end of the central cyclone separator and having its upper end connected to discharge gas into the drying cyclone separator, means for feeding material from the water-extracting means into the upper end of the drying stack, a deflector arranged in the upper portion of the drying stack in the path of material falling into the stack from the feeding means, the drying stack having a restriction in its lower portion but forming an open passage for gas from the central cyclone separator to the drying cyclone separator, and means for propelling gas through the firing means, the preheating cyclone separator, the central cyclone separator, the drying stack and the drying cyclone separator at a velocity sufficient to entrain the material falling into the drying stack.

References Cited

UNITED STATES PATENTS

| 3,083,472 | 4/1963 | Helming | 263—32 X |
| 2,797,077 | 6/1957 | Muller | 263—32 |
| 3,317,201 | 5/1967 | Muller et al. | 263—32 |

FOREIGN PATENTS

| 1,801,354 | 10/1968 | Germany | 263—21 A |
| 1,154,768 | 9/1963 | Germany | 34—57 R |

JOHN J. CAMBY, Primary Examiner

R. A. DUA, Assistant Examiner

U.S. Cl. X.R.

34—57 R